_____

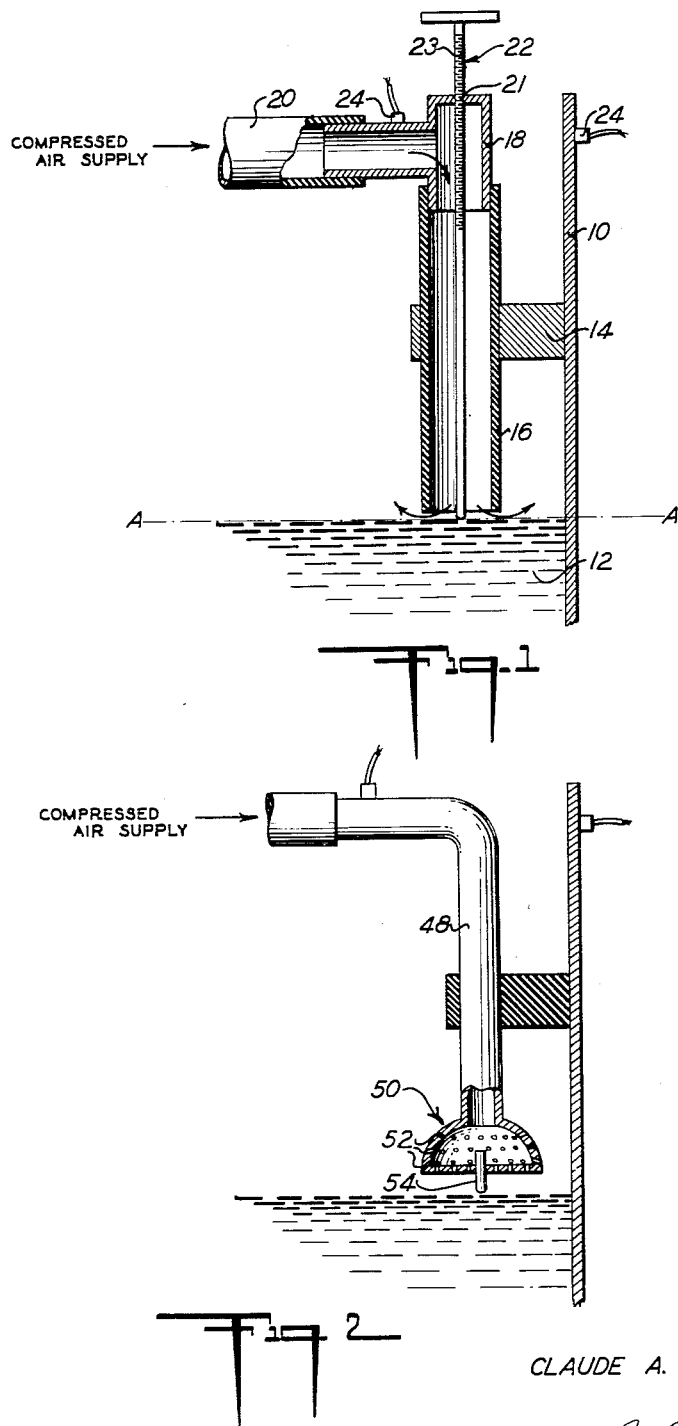

United States Patent Office 2,727,112
Patented Dec. 13, 1955

_____

2,727,112

LIQUID LEVEL CONTROL

Claude A. Davis, Danville, Va.

Application December 18, 1952, Serial No. 326,732

1 Claim. (Cl. 200—152)

The present invention relates to a device for controlling the level of foaming liquids in dye vats and the like. My invention is generally applicable to an intermittent type of liquid supply system which depends for its activation upon an electrical circuit being opened or closed as predetermined by the level of liquid within an open container.

Apparatus for these systems normally include two electrodes. The container itself usually forms one of them and the other is a sensing electrode insulated from the first electrode and positioned at a predetermined level in the container. As liquid is brought into the container, its level rises until it reaches the level of the sensing electrode and contacts it to close a circuit through the liquid which automatically activates apparatus to shut off the flow of liquid into the container. As liquid is removed from the container, its level will fall below the level of the sensing electrode, open the circuit, and activate apparatus to permit liquid to enter again. The word "electrode" is used hereinafter in the specification and claim to describe the sensing electrode, unless it is specified to the contrary.

Prior art devices of this type have been generally unsatisfactory in controlling the level of liquids tending to foam. This is particularly true because the foam hits the electrode to give a false signal; i. e., to prematurely close the circuit and shut off the liquid supply before the liquid level in the container is high enough. With the device of the present invention, this and other difficulties are avoided and accurate liquid levels are obtained regardless of the degree of foaming.

In its broadest aspects, my invention comprises a liquid level sensing electrode with means for blowing air around that electrode in such a manner as to prevent foam from contacting it.

More specifically, my invention comprises an elongated vertical sensing electrode sheathed throughout the greater portion of its length with only a small unsheathed contact point at its bottom and air blowing means positioned adjacent the contact point for blowing foam away.

Even more specifically, a preferred form of my invention comprises a non-conducting or insulating hollow cylindrical sheath mounted generally vertically at a predetermined level within a container, an electrode in the form of a rod extending through said sheath in spaced relation thereto with only a contact point extending beyond the sheath at the bottom for contacting the liquid and means for introducing compressed air into said cylindrical sheath so that it flows around said electrode and out of said sheath adjacent the contact point. The advantage of this form of the invention is that the insulating sheath keeps high foam away from the electrode, and the compressed air keeps the foam away from the contact point. A further preferred form of this device consists in making the electrode rod adjustable in the sheath so that it can be moved up and down to obtain varying liquid levels without shifting the position of the sheath itself with respect to the container.

The present invention can be more readily understood by reference to the accompanying drawings in which:

Figure 1 is a cross-section of a preferred form of the invention, and

Figure 2 is a perspective view of another form of the invention.

In that form of the invention shown in Figure 1, a wall of any open conventional liquid container is indicated generally at the numeral 10 and liquid within the container is shown at 12. A support 14 mounted on the container wall 10 carries a cylindrical hollow insulated sheath 16 positioned vertically in the support just above the desired liquid level indicated by the dotted line A—A. A hollow L-shaped member 18 has one end connected to the top of sheath 16 and the other end connected to a supply of compressed air 20. The base of the L-shaped member is provided with a screw threaded aperture 21. An electrode rod 22 is vertically mounted in the base of the L-shaped member so that it extends in spaced relationship through the center of the sheath 16. Electrode 22 is provided with screw threads 23 mating with those in the base of L-shaped member 18 so that rotation of member 22 will move it up or down to predetermine the position of line A—A. L-shaped member 18 and the wall 10 are both conducting metallic members, and each is provided with a terminal 24 leading to a conventional supply control box, not shown, so that when the liquid 12 touches electrode 22, a circuit is closed through the liquid, thereby actuating means for ceasing flow of liquid from the supply. Compressed air continuously flows into the sheath from supply 20 and L-shaped member 18 to blow bubbles away from the bottom of electrode rod 22, which is its contact point. Should foam pile up to such an extent that it would otherwise fall over against an electrode, sheath 16 holds it away and prevents contact which would close the circuit to prematurely stop liquid supply. This device operates satisfactorily in high foaming liquids substantially without maintenance.

In that form of the invention shown in Figure 2, a metallic pipe 48 connected to a source of compressed air, not shown, serves as an electrode holder and conductor. The metal pipe serves to conduct electrical currents but is supported on the container by an insulating member to prevent short circuiting the liquid. A bell-shaped head 50 is positioned on the bottom of the pipe 48 and is provided with a large number of small holes 52 for dispersing compressed air in all directions so as to blow foam away. An electrode 54 is positioned just beneath the bell-shaped diffuser head where it receives maximum protection by the air blasts.

This invention may be used successfully in apparatus employing more than one sensing electrode as the invention is more in the specific electrode structure than in the overall system. Variations in mounting members for the electrodes are unimportant, as satisfactory results can be obtained with any means for positioning the sensing electrode contact so that no circuit is closed until the liquid touches it.

In that form of the invention involving sheathing electrodes, the sheath may have any desired clearance from the electrode. It may be snug so that compressed air will have to flow through the electrode, or it may have as much as a few inches clearance. A three-fourths inch diameter sheath is very satisfactory for a one-fourth inch electrode. The distance between the bottom of the contact and the bottom of the sheath is important to the extent that it must be relatively small to guard against high toppling foam. In all forms of the invention the rate of air flow must be regulated in accordance with practical considerations. It must be continuous and at a sufficient velocity to blow back the specific foam. This rate can be readily determined by on the spot observation.

Thus, it will be seen that accurate liquid levels are obtained even in foaming liquids by means of a sensing contact electrode positioned at a predetermined spot which is protected by a continuous blast of compressed air.

I claim:

A sensing electrode adapted for use in apparatus for maintaining an even liquid level in an open container which comprises a hollow L-shaped member, an electrically insulating hollow sheath connected to one end of said member, an electrode extending through said sheath and straight through the base of said L-shaped member, means for mounting said member on said container as an inverted L, and means for regulating the position of said electrode in said L-shaped member, the opposite end of said L-shaped member being adapted to receive means for supplying compressed air through said member and said sheath, said sheath being spaced from said electrode at the sensing level an amount sufficient to allow air circulation.

References Cited in the file of this patent

UNITED STATES PATENTS

| | | |
|---|---|---|
| 2,053,938 | Barker, Jr. | Sept. 8, 1936 |
| 2,382,516 | Sprague | Aug. 14, 1945 |
| 2,431,544 | Dittrich | Nov. 25, 1947 |
| 2,502,876 | Mullen | Apr. 4, 1950 |